(12) United States Patent
Wang et al.

(10) Patent No.: US 9,749,454 B2
(45) Date of Patent: Aug. 29, 2017

(54) METHOD AND DEVICE FOR CONTROLLING SMART DEVICE

(71) Applicant: Xiaomi Inc., Beijing (CN)

(72) Inventors: Yuanbo Wang, Beijing (CN); Qiao Ren, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/204,374

(22) Filed: Jul. 7, 2016

(65) Prior Publication Data

US 2017/0019520 A1 Jan. 19, 2017

(30) Foreign Application Priority Data

Jul. 13, 2015 (CN) .......................... 2015 1 0408868

(51) Int. Cl.
*H04B 1/38* (2015.01)
*H04M 1/725* (2006.01)
(Continued)

(52) U.S. Cl.
CPC .......... *H04M 1/72527* (2013.01); *F24F 3/16* (2013.01); *H04L 12/282* (2013.01);
(Continued)

(58) Field of Classification Search
CPC ............. H04L 12/2803; H04L 12/2825; H04L 2012/2841; H04L 2012/285;
(Continued)

(56) References Cited

U.S. PATENT DOCUMENTS 8,908,217 B2 12/2014 Anezaki et al.
2012/0127011 A1 5/2012 Lee et al.
(Continued)

FOREIGN PATENT DOCUMENTS

CN 101783063 A 7/2010
CN 102611753 A 7/2012
(Continued)

OTHER PUBLICATIONS

Extended European Search Report of European Patent Application No. 16164354.9, from the European Patent Office, dated Sep. 13, 2016.
(Continued)

*Primary Examiner* — Golam Sorowar
(74) *Attorney, Agent, or Firm* — Finnegan, Henderson, Farabow, Garrett & Dunner LLP

(57) ABSTRACT

The present disclosure relates to a method and a device for controlling a smart device. The method includes: when a connection is established between the terminal and a smart device, detecting whether the smart device is set with a personalized control interface; when detecting that the smart device is set with the personalized control interface, acquiring a personalized interface plug-in of the smart device, the personalized interface plug-in including a personalized function type and a personalized status display type; generating control options and a status display interface, based on at least one of the personalized interface plug-in or configuration information of a common control interface of the smart device; and controlling the smart device according to the control options and the status display interface.

15 Claims, 8 Drawing Sheets

(51) Int. Cl.
*H04L 12/28* (2006.01)
*H04N 21/41* (2011.01)
*H04L 12/24* (2006.01)
*H04L 29/08* (2006.01)
*F24F 3/16* (2006.01)

(52) U.S. Cl.
CPC ........ *H04L 41/0809* (2013.01); *H04L 67/025* (2013.01); *H04N 21/4126* (2013.01); *H04N 21/4131* (2013.01)

(58) Field of Classification Search
CPC ..... H04L 12/2823; H04L 67/02; H04L 67/10; H04L 67/125; H04L 12/2807; H04L 12/2814; H04L 12/2818; H04L 12/282; H04W 12/08; H04W 4/005; H04W 76/02; H04W 12/04; H04W 12/06; H04W 48/16; H04W 4/006; H04W 4/02; H04W 4/12; H04W 72/0433; H04W 76/021; H04W 84/18; H04W 88/02; H04W 88/06; H04W 88/08; H04W 8/005
See application file for complete search history.

(56) References Cited

U.S. PATENT DOCUMENTS

| | | | |
|---|---|---|---|
| 2012/0173767 A1 | 7/2012 | Kim et al. | |
| 2014/0156082 A1* | 6/2014 | Ha | D06F 33/02 700/275 |
| 2014/0233060 A1 | 8/2014 | Anezaki et al. | |
| 2015/0026610 A1 | 1/2015 | Kim et al. | |
| 2016/0215430 A1* | 7/2016 | Ha | G08C 17/02 |

FOREIGN PATENT DOCUMENTS

| | | |
|---|---|---|
| CN | 103399548 A | 11/2013 |
| CN | 103607331 A | 2/2014 |
| CN | 103997584 A | 8/2014 |
| JP | 2005-303659 A | 10/2005 |
| KR | 10-2015-0072766 A | 6/2015 |
| RU | 2009136414 A | 4/2011 |
| RU | 2530256 C2 | 10/2014 |
| WO | WO 2009/143608 A1 | 12/2009 |
| WO | WO 2012/060679 A1 | 5/2012 |

OTHER PUBLICATIONS

English version of International Search Report of PCT/CN2015/090656, mailed from the State Intellectual Property Office of China dated Apr. 8, 2016.

Official Action for Russian Application No. 2016115731/11(024726), mailed from the Russian Federal Service for Intellectual Property dated Jun. 15, 2017.

* cited by examiner

METHOD AND DEVICE FOR CONTROLLING SMART DEVICE

CROSS-REFERENCE TO RELATED APPLICATIONS

The present application is based upon and claims priority to Chinese Patent Application No. 201510408868.X, filed Jul. 13, 2015, the entire contents of which are incorporated herein by reference.

TECHNICAL FIELD

The present disclosure generally relates to the technical field of smart devices and, more particularly, to a method and a device for controlling a smart device.

BACKGROUND

With the development of smart-device and Internet technologies, more and more smart devices can be remotely controlled via a network.

To remotely control a smart device, a remote control application installed on a terminal is typically used to monitor and control the smart device. A user can conduct personalized settings in the application using options provided by the application. For example, the user may set a status display interface for an air purifier, to display a color varying with the quality of the air. However, when other terminals and/or users are also connected to the air purifier, the application can only present a common control interface to the user.

SUMMARY

According to a first aspect of the present disclosure, there is provided a method for use in a terminal, comprising: when a connection is established between the terminal and a smart device, detecting whether the smart device is set with a personalized control interface; when detecting that the smart device is set with the personalized control interface, acquiring a personalized interface plug-in of the smart device, the personalized interface plug-in including a personalized function type and a personalized status display type; generating control options and a status display interface, based on at least one of the personalized interface plug-in or configuration information of a common control interface of the smart device; and controlling the smart device according to the control options and the status display interface.

According to a second aspect of the present disclosure, there is provided a terminal, comprising: a processor; and a memory for storing instructions executable by the processor; wherein the processor is configured to perform: when a connection is established between the terminal and a smart device, detecting whether the smart device is set with a personalized control interface; when detecting that the smart device is set with the personalized control interface, acquiring a personalized interface plug-in of the smart device, the personalized interface plug-in including a personalized function type and a personalized status display type; generating control options and a status display interface, based on at least one of the personalized interface plug-in or configuration information of a common control interface of the smart device; and controlling the smart device according to the control options and the status display interface.

According to a third aspect of the present disclosure, there is provided a non-transitory computer-readable storage medium storing instructions that, when executed by a processor in a terminal, cause the terminal to perform: when a connection is established between the terminal and a smart device, detecting whether the smart device is set with a personalized control interface; when detecting that the smart device is set with the personalized control interface, acquiring a personalized interface plug-in of the smart device, the personalized interface plug-in including a personalized function type and a personalized status display type; generating control options and a status display interface, based on at least one of the personalized interface plug-in or configuration information of a common control interface of the smart device; and controlling the smart device according to the control options and the status display interface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
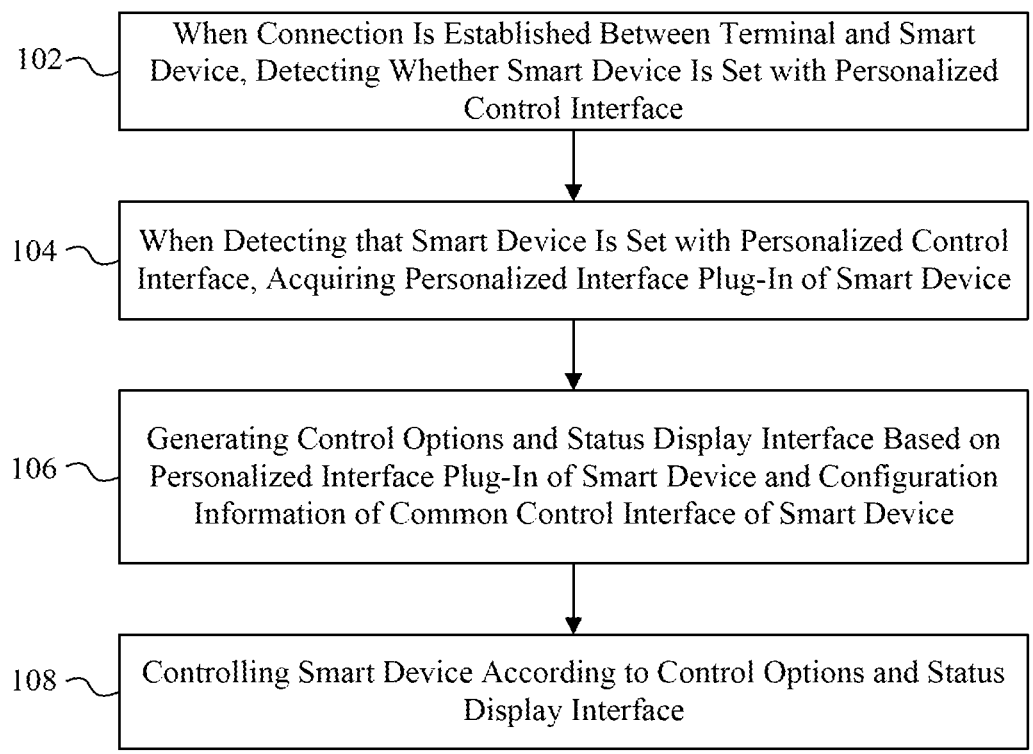
FIG. 1 is a flowchart of a method for controlling a smart device, according to an exemplary embodiment.

FIG. 1 is a flowchart of a method 100 for controlling a smart device, according to an exemplary embodiment. For example, the method 100 may be applied in a terminal. Referring to FIG. 1, the method 100 includes the following steps.

In step 102, when the terminal establishes a connection with the smart device, the terminal detects whether the smart device is set with a personalized control interface.

In step 104, if it is detected that the smart device is set with a personalized control interface, the terminal acquires a personalized interface plug-in of the smart device. The personalized interface plug-in includes a personalized function type and a personalized status display type.

In step 106, the terminal generates control options and a status display interface, based on the personalized interface plug-in and configuration information of a common control interface of the smart device.

In step 108, the terminal controls the smart device based on the control options and the status display interface.

In the embodiments, the terminal is pre-installed with a framework control application. A user can use the framework control application to assist the smart device in connecting to a network. After the smart device is connected to the network, the terminal may first form a connection with the smart device and then generate a control interface for controlling the smart device. The control interface contains control options and a status display interface.

In one embodiment, the framework control application may include a device display list. The device display list includes the display-interface identifiers that correspond to various types of smart devices connected to the terminal. These display-interface identifiers are used by the terminal as entry options for controlling the connected smart devices. In exemplary embodiments, the device display list may include entry options, i.e., display-interface identifiers, for one or more smart devices. The user can select an entry option to confirm the connection of the corresponding smart device to the terminal, and then enter the control interface corresponding to the smart device after the connection is confirmed.

The framework control application may include various icons, control commands, and display controls. The icons and control commands are used for generating the control options. The display controls are used for generating the status display interface.

In the present embodiment, before the terminal performs the method 100, the smart device has been already connected to the network. A second terminal may be used to assist the smart device in connecting to the network and to set a personalized control interface for the smart device. The personalized control interface may include personalized control options and a personalized status display interface. The personalized control options and the personalized status display interface may be pre-stored as configuration information in the framework control application, and be provided to the user when the user chooses to implement personalized settings.

For example, there may be provided a control option for controlling a smart camera to automatically turn on when an object is detected to move in front of the smart camera. As another example, there may be provided a status display interface for a smart air purifier. The status display interface can display a background color that varies with the quality of the air.

After the user sets the personalized control interface in the second terminal, the second terminal may generate a personalized interface plug-in based on the personalized control options and the personalized status display interface, both of which are set in the personalized control interface. The personalized interface plug-in may contain a personalized function type corresponding to the personalized control options, and a personalized status display type corresponding to the personalized status display interface. The second terminal may then send the personalized interface plug-in to the corresponding smart device or a cloud server. The personalized interface plug-in may be then stored in the smart device or cloud server.

According to the method 100, when the terminal establishes a connection with the smart device, the terminal detects whether the smart device is set with a personalized control interface. If it is detected that the smart device is set with a personalized control interface, the terminal acquires a personalized interface plug-in of the smart device. The terminal then generates control options and a status display interface based on the personalized interface plug-in and the configuration information of a common control interface of the smart device. The terminal controls the smart device based on the control options and the status display interface. In this control manner, multiple terminals can share a personalized control interface for control a smart device. Thus, the control efficiency and human-machine interaction are improved.

Figure 2:
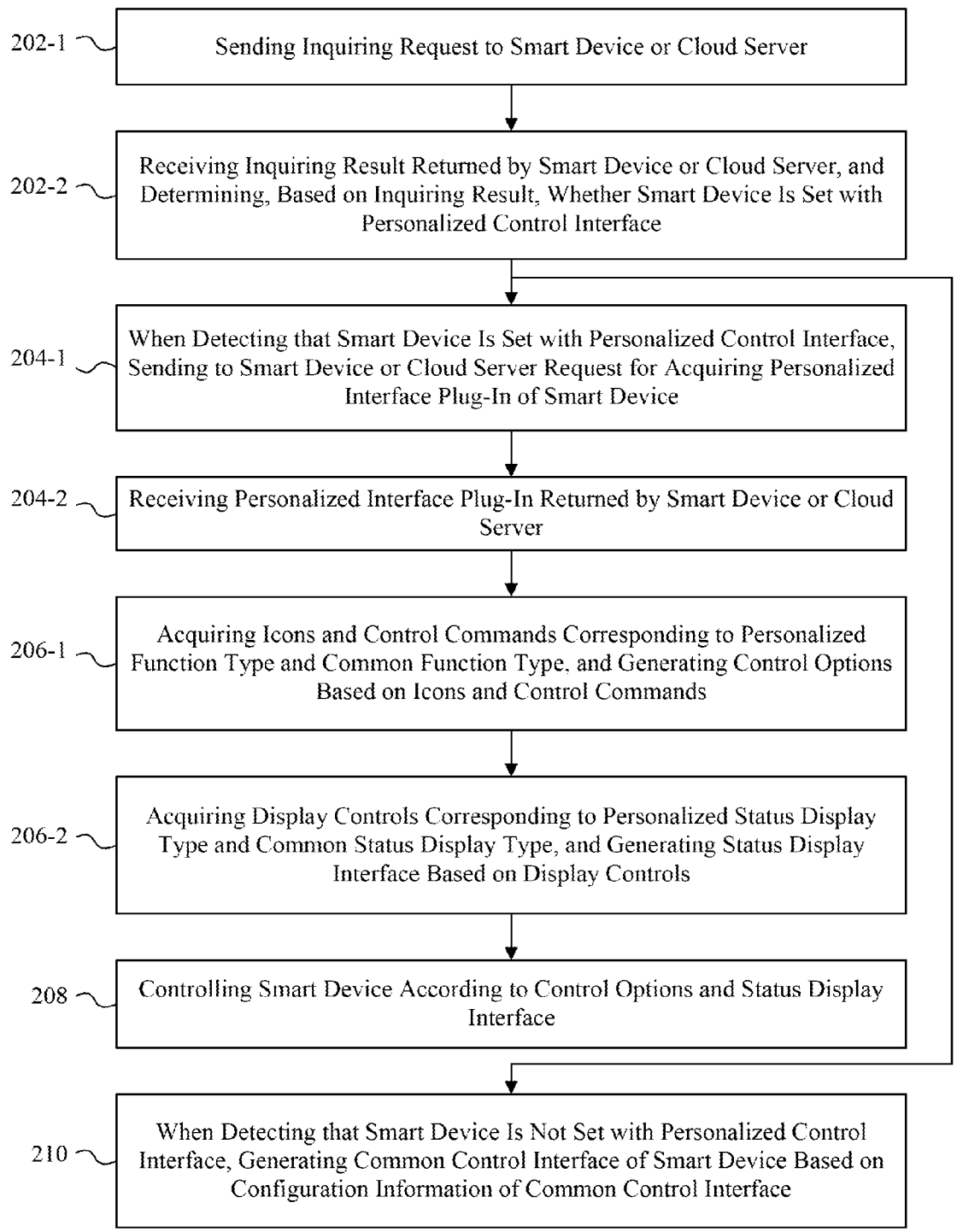
FIG. 2 is a flowchart of a method for controlling a smart device, according to an exemplary embodiment.

FIG. 2 is a flowchart of a method 200 for controlling a smart device, according to an exemplary embodiment. For example, the method 200 may be applied in a terminal. Referring to FIG. 2, the method 200 includes the following steps.

In step 202, when the terminal establishes a connection with the smart device, the terminal detects whether the smart device is set with a personalized control interface.

In exemplary embodiments, the terminal and the smart device may be at the same location or at different locations. For example, the smart device may be a smart air conditioner installed at an user's home, while the terminal may be carried by the user self. When the user is at home, the terminal and the smart device are at the same location. However, when the user is working in an office building, the terminal and the smart device are at different locations.

If the terminal and the smart device are at the same location, the data used for establishing the connection between the terminal and the smart device, the control commands, the status data, or the like, may be transmitted between the terminal and the smart device via a network device connected to both the terminal and the smart device. Alternatively, the above data, control commands, and status data may be transmitted via a direct connection between the terminal and smart device. The direct connection may be established using Bluetooth technology, Wireless Fidelity (WiFi) technology, or the like.

If the terminal and the smart device are not at the same location, a cloud server may be used as a transit between the terminal and the smart device to facilitate the transmission of above data, control commands, and status data.

In the present embodiment, the terminal may start to perform step 202 after the terminal is connected to the smart device for the first time.

As described above, the terminal may connect to the smart device in various manners. Depending on the connection manner, the terminal may use different ways to detect whether the smart device is set with the personalized control interface. Accordingly, step 202 may be implemented in the following sub-steps.

In sub-step 202-1, the terminal sends an inquiring request to the smart device or a cloud server.

If the inquiring request is sent to the cloud server, the inquiring request carries an identification of the smart device, such that the cloud server can determine whether the smart device is set with a personalized control interface, based on the identification of the smart device.

If the terminal detects that a personalized interface plug-in is stored in a register of the smart device, or a personalized interface plug-in corresponding to the smart device is stored in the cloud server, the terminal determines that the smart device is set with a personalized control interface.

In sub-step 202-2, the terminal receives an inquiring result returned by the smart device or the cloud server, and determines, based on the inquiring result, whether the smart device is set with a personalized control interface.

If it is determined that the smart device is set with a personalized control interface, the terminal performs step 204. If it is determined that the smart device is not set with a personalized control interface, the terminal performs step 210.

In step 204, if it is detected that the smart device is set with a personalized control interface, the terminal acquires a personalized interface plug-in of the smart device. The personalized interface plug-in includes a personalized function type and a personalized status display type.

Similar to step 202, depending on the manner used to connect the terminal and the smart device, the terminal may use different ways to acquire the personalized interface plug-in. Accordingly, step 204 may be implemented in the following sub-steps.

In sub-step 204-1, if it is detected that the smart device is set with a personalized control interface, the terminal sends to the smart device or a cloud server a request for acquiring a personalized interface plug-in of the smart device.

If the request for acquiring the personalized interface plug-in is sent to the cloud server, the request needs to carry the identification of the smart device, such that the cloud server can perform acquire the requested personalized interface plug-in based on the identification of the smart device.

In sub-step 204-2, the terminal receives a personalized interface plug-in returned by the smart device or the cloud server.

In one embodiment, in setting a personalized control interface, a user can set only the personalized control options or only the personalized status display interface. Accordingly, the personalized interface plug-in may contain one or both of a personalized function type and a personalized status display type.

In some embodiments, when the terminal determines that the smart device is set with a personalized control interface, the terminal may notify the user that the smart device is set with the personalized control interface by displaying a pop-up message in a screen of the terminal. The terminal may also include several options in the message to allow the user to choose whether to generate a personalized control interface or generate a common control interface of the smart device. When the user chooses to generate the personalized control interface, the terminal performs step 204. When the user chooses to generate the common control interface, the terminal generates the common control interface based on the configuration information of the common control interface.

In step 206, the terminal generates control options and a status display interface, based on the personalized interface plug-in and the configuration information of a common control interface of the smart device.

The configuration information of the common control interface may contain a common function type and/or a common status display type. The configuration information of the common control interface may be stored in a framework control application of the terminal. The configuration information may also be stored in the smart device or a cloud server. Depending on whether the configuration information of the common control interface is stored in the smart device or the cloud server, the terminal may acquire the configuration information in manners similar to the manners for acquiring the personalized interface plug-in(sub-steps 204-1 and 204-2), which will not be repeated here.

In the present embodiment, the terminal may generate the control options in the control interface, based on the personalized function type in the personalized interface plug-in and the common function type in the configuration information of the common control interface. Accordingly, the terminal may generate the control options according to the following sub-step 206-1.

In addition, the terminal may generate the status display interface in the control interface, based on the personalized status display type in the personalized interface plug-in and the common status display type in the configuration information of the common control interface. Accordingly, the terminal may generate the status display interface according to the following sub-step 206-2.

In sub-step 206-1, the terminal acquires icons and control commands corresponding to the personalized function type and the common function type, and generates the control options based on the icons and control commands For example, the common function type of a smart air purifier may include but not limited to: turn on/off, mode selection, and/or night mode. And the personalized function type of the smart air purifier may include but not limited to a customized activation time control.

The framework control application of the terminal may pre-store the icons and control commands corresponding to various function types, including the personalized function type and the common function type. The framework control application may generate, in the control interface, the control options for controlling the smart device by acquiring, one by one, the icons and control commands corresponding to the functions.

Accordingly, in the above example of the smart air purifier, the framework control application may generate, in the control interface, the four control options, i.e., turn on/off, mode selection, night mode, and customized activation time control.

In step sub-206-2, the terminal acquires display controls corresponding to the personalized status display type and the common status display type, and generates the status display interface based on the acquired display controls.

The framework control application of the terminal may pre-store display controls corresponding to various status display types, including the personalized status display type and the common status display type. A display control includes a data input interface for acquiring a status parameter corresponding to the status display type. Through the data input interface, the terminal sends a request for acquiring a status parameter to the smart device, and receives the status parameter returned by the smart device. In exemplary embodiments, the terminal may receive various status parameters returned by the smart device through a direct connection or via a network.

In some situations, the personalized status display type may conflict with the common status display type. For example, for a smart air purifier, the personalized status display type may correspond to a display control that displays a background color varying with the quality of the air, while the common status display type may correspond to a display control that displays the quality of the air with an unchanged color. These two display controls have the same type.

Therefore, in some embodiments, during the generation of the status display interface, the terminal may compare the type of the display control corresponding to the personalized status display type with the type of the display control corresponding to the common status display type. If the two display controls have the same type, the terminal may only acquire a display control based on the personalized status display type, and generate the corresponding status display interface. If the two display controls do not have the same type, the terminal may acquire display controls based on both the personalized status display type and the common status display type respectively, and then generate the status display interface based on the acquired display controls.

In step 208, the terminal controls the smart device according to the control options and the status display interface.

After the terminal generates the control options and the status display interface, the user may perform, in the control interface, the control operations of various functions. According to the control options selected by the user, the terminal may send corresponding control commands to the smart device.

In step 210, if it is detected that the smart device is not set with a personalized control interface, the terminal generates a common control interface of the smart device, based on the configuration information of the common control interface.

The common control interface includes a control interface and a status display interface. The control interface and the status display interface can be generated based on the common function type and the common status display type specified in the configuration information of the common control interface. The terminal may generate the control interface and the status display interface in the following steps.

In a first step, the terminal acquires icons and control commands corresponding to the common function type, and generates, in a control interface region, control options corresponding to the common function type.

In a second step, the terminal acquires a display control corresponding to the common status display type. The display control includes a data input interface for acquiring a status parameter corresponding to the common status display type.

In a third step, the terminal loads the display control in a status display region, and generates the status display interface.

Figure 3:
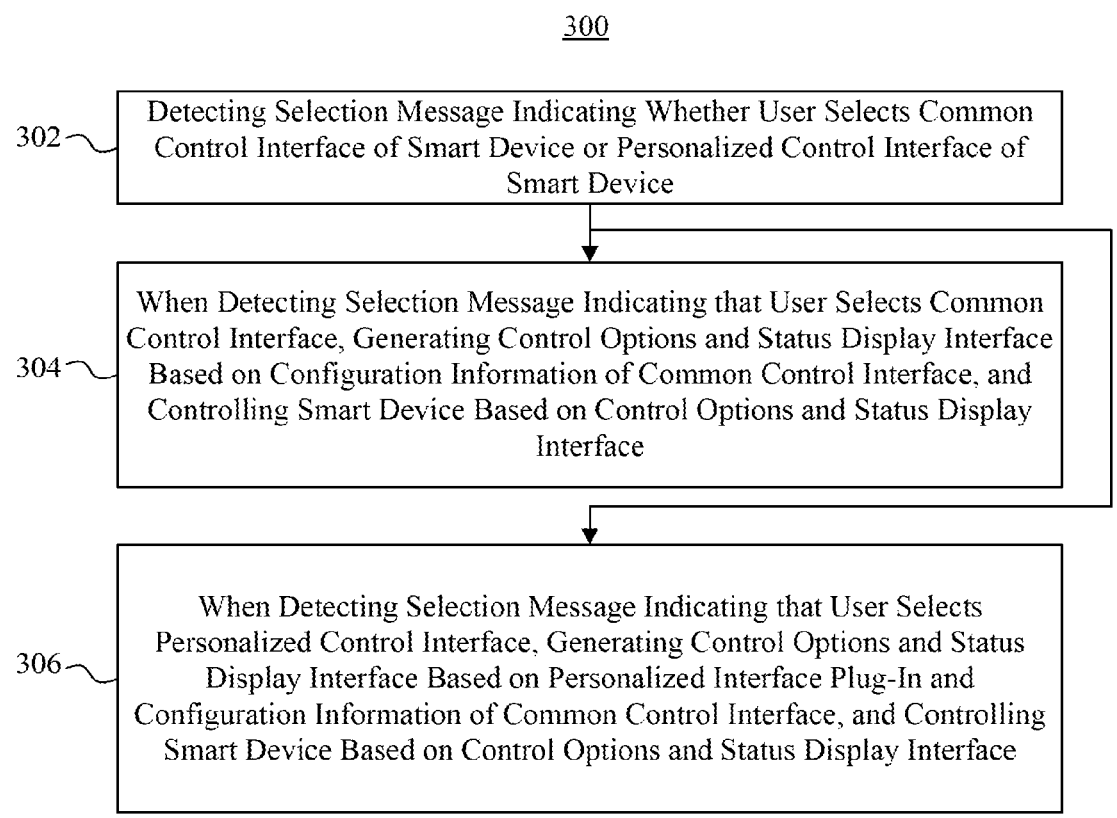
FIG. 3 is a flowchart of a method for controlling a smart device, according to an exemplary embodiment.

FIG. 3 is a flowchart of a method 300 for controlling a smart device, according to an exemplary embodiment. For example, the method 300 may be applied in a terminal. In the present embodiment, a user selects, through a framework control application in the terminal, the manner for generating a control interface associated with a smart device. The terminal generates the control interface based on the user-selected manner. Referring to FIG. 3, the method 300 includes the following steps.

In step 302, the terminal detects a selection message indicating whether the user selects a common control interface or a personalized control interface of the smart device.

Before the terminal generates the control interface of the smart device, if the terminal detects that the smart device is set with a personalized control interface, the framework control application in the terminal may present a prompt to the user, requesting the user to select whether to generate the common control interface or the personalized control interface.

The prompt may be in the form of a dialog box that provides options corresponding to the common control interface and the personalized control interface respectively. After the user selects one of the options, the framework control application may generate a selection message. The selection message contains an identification of the selected control interface, i.e., an identification of the common control interface or an identification of the personalized control interface.

In step 304, when the terminal detects that the user selects the common control interface, the terminal generates the control options and the status display interface based on the configuration information of the common control interface, and controls the smart device based on the control options and the status display interface.

In step 306, when the terminal detects that the user selects the personalized control interface, the terminal generates the control options and the status display interface based on the personalized interface plug-in and the configuration information of the common control interface, and controls the smart device based on the control options and the status display interface.

In steps 304 and 306, the specific manners of generating of the common control interface and the personalized control interface are similar to the manners described in the methods 100 and 200.

According to the method 300, when the terminal establishes a connection with the smart device, the terminal detects which control interface is selected by the user and generates the selected control interface accordingly. The terminal then controls the smart device through the generated control interface. The method 300 allows the user to select the control manner as needed, thereby improving the control efficiency and human-machine interactions.

Figure 4:
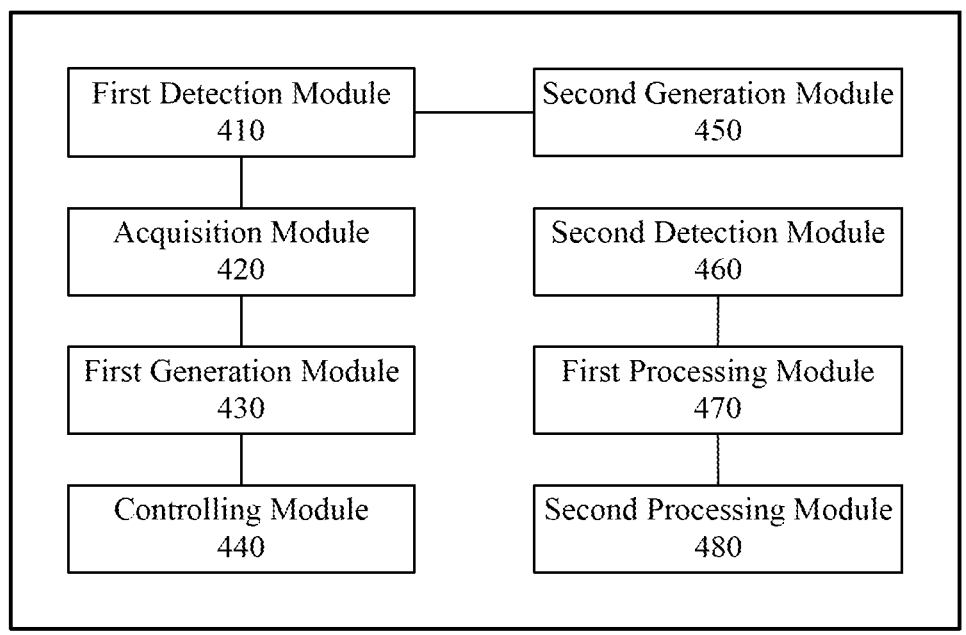
FIG. 4 is a block diagram of a device for controlling a smart device, according to an exemplary embodiment.

FIG. 4 is a block diagram of a device 400 for controlling a smart device, according to an exemplary embodiment. For example, the device 400 may be implemented as part or whole of a terminal. Referring to FIG. 4, the device 400 may include a first detection module 410, an acquisition module 420, a first generation module 430, and a controlling module 440.

The first detection module 410 is configured to, when the terminal establishes a connection with the smart device, detect whether the smart device is set with a personalized control interface.

The acquisition module 420 is configured to, if it is detected that the smart device is set with a personalized control interface, acquire a personalized interface plug-in of the smart device. The personalized interface plug-in contains a personalized function type and a personalized status display type.

The first generation module 430 is configured to generate control options and a status display interface based on the personalized interface plug-in component and configuration information of a common control interface of the smart device.

The controlling module 440 is configured to control the smart device according to the control options and the status display interface.

Figure 5:
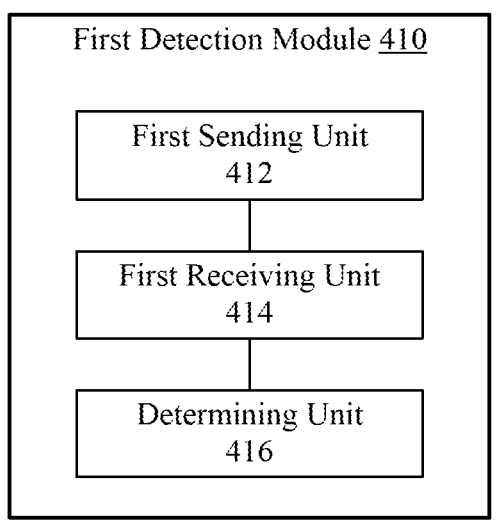
FIG. 5 is a block diagram of a first detection module in a device for controlling a smart device, according to an exemplary embodiment.

FIG. 5 is a block diagram of a first detection module 410 in the device 400 (FIG. 4), according to an exemplary embodiment. Referring to FIG. 5, the first detection module 410 may include a first sending unit 412, a first receiving unit 414, and a determining unit 416.

The first sending unit 412 is configured to send an inquiring request to the smart device or a cloud server.

The first receiving unit 414 is configured to receive an inquiring result returned by the smart device or the cloud server.

The determining unit 416 is configured to determine whether the smart device is set with the personalized control interface, based on the inquiring result.

Figure 6:
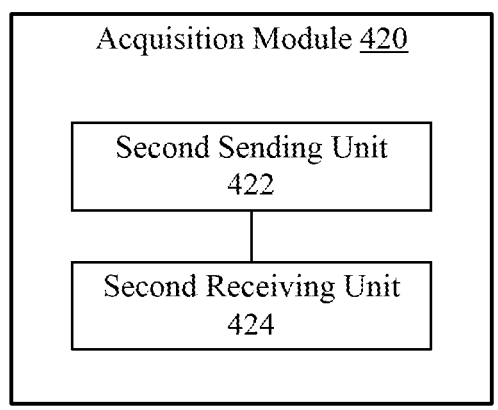
FIG. 6 is a block diagram of an acquisition module in a device for controlling a smart device, according to an exemplary embodiment.

FIG. 6 is a block diagram of an acquisition module 420 in the device 400 (FIG. 4), according to an exemplary embodiment. Referring to FIG. 6, the acquisition module 420 may include a second sending unit 422 and a second receiving unit 424.

The second sending unit 422 is configured to send to the smart device or a cloud server a request for acquiring the personalized interface plug-in of the smart device.

The second receiving unit 424 is configured to receive the personalized interface plug-in returned by the smart device or the cloud server.

Figure 7:
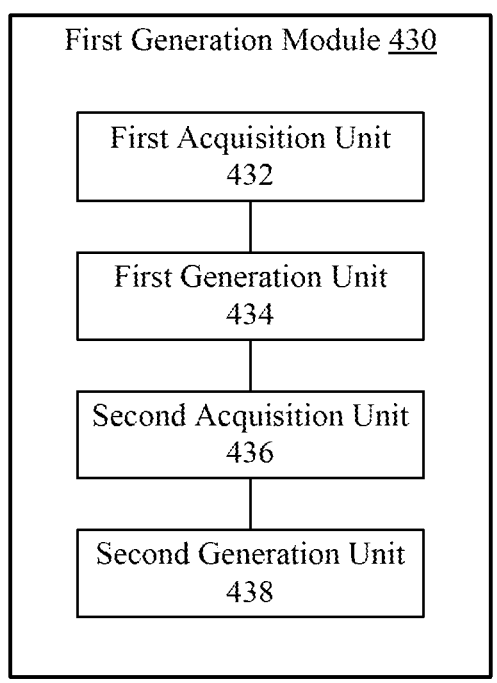
FIG. 7 is a block diagram of a first generation module in a device for controlling a smart device, according to an exemplary embodiment.

FIG. 7 is a block diagram of a first generation module 430 in the device 400 (FIG. 4), according to an exemplary embodiment. Referring to FIG. 7, the first generation module 430 may include a first acquisition unit 432, a first generation unit 434, a second acquisition unit 436, and a second generation unit 438.

The first acquisition unit 432 is configured to acquire icons and control commands corresponding to the personalized function type and a common function type in the configuration information of the common control interface.

The first generation unit 434 is configured to generate the control options based on the icons and control commands.

The second acquisition unit 436 is configured to acquire display controls corresponding to the personalized status display type and a common status display type in the configuration information of the common control interface.

The second generation unit 438 is configured to generate the status display interface based on the display controls.

With continued reference to FIG. 4, the device 400 may further include a second generation module 450 configured to, if it is detected that the smart device is not set with a personalized control interface, generate a common control interface of the smart device based on the configuration information of the common control interface.

Still referring to FIG. 4, the device 400 may further includes a second detection module 460, a first processing module 470, and a second processing module 480.

The second detection module 460 is configured to detect a selection message that indicates whether the user selects a common control interface of the smart device or a personalized control interface of the smart device.

The first processing module 470 is configured to, when it is detected that the selection message indicates that the user selects the common control interface, generate the control options and the status display interface according to the configuration information of the common control interface, and control the smart device according to the control options and the status display interface.

The second processing module 480 is configured to, when it is detected that the selection message indicates that the user selects the personalized control interface, generate the control options and the status display interface based on the personalized interface plug-in and configuration information of the common control interface, and control the smart device based on the control options and the status display interface.

Figure 8:
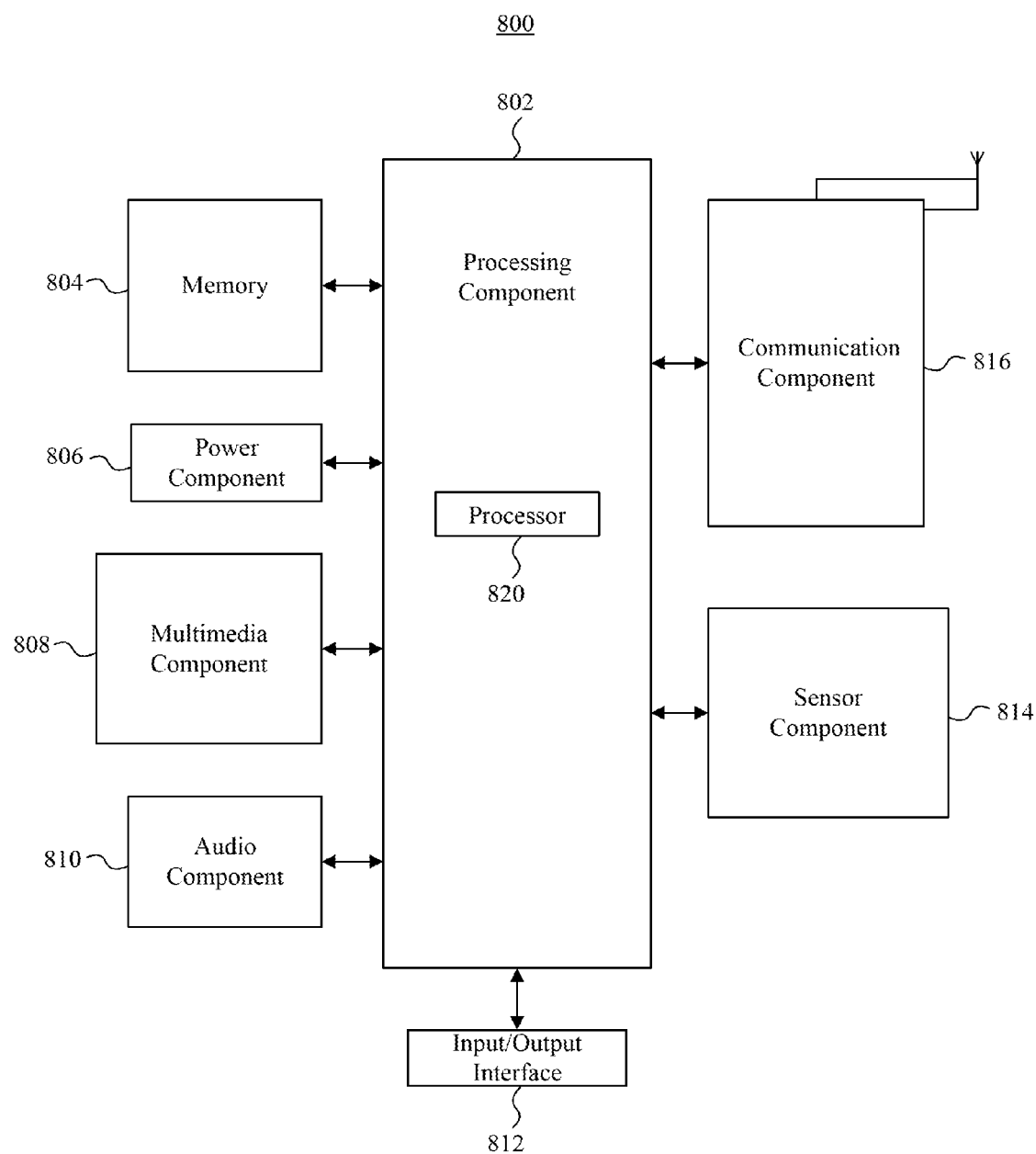
FIG. 8 is a block diagram of a device for controlling a smart device, according to an exemplary embodiment.

FIG. 8 is a block diagram of a terminal 800 for controlling a smart device, according to an exemplary embodiment. For example, the terminal 800 may be a mobile phone, a computer, a digital broadcast terminal, a messaging device, a gaming console, a tablet, a medical device, exercise equipment, a personal digital assistant, a terminal, a smart router, a smart air purifier, a smart water dispenser, a smart camera, and the like.

Referring to FIG. 8, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive external multimedia data while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like.

The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as WiFi, 2G, 3G, 4G, or a combination thereof. In one exemplary embodiment, the communication component 816 receives a broadcast signal or broadcast associated information from an external broadcast management system via a broadcast channel In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the terminal 800, for performing the above-described methods. For example, the non-transitory computer-readable storage medium may be a ROM, a RAM, a CD-ROM, a magnetic tape, a floppy disc, an optical data storage device, and the like.

Those skilled in the art will understand that the above-described modules/units can each be implemented by hardware, or software, or a combination of hardware and software. Those skilled in the art will also understand that multiple ones of the above-described modules/units may be combined as one module/unit, and each of the above-described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for use in a terminal, comprising:
when a connection is established between the terminal and a smart device, detecting whether the smart device is set with a personalized control interface;
when detecting that the smart device is set with the personalized control interface, acquiring a personalized interface plug-in of the smart device, the personalized interface plug-in including a personalized function type and a personalized status display type;
generating control options and a status display interface, based on at least one of the personalized interface plug-in or configuration information of a common control interface of the smart device, wherein the generating of the control options and the status display interface includes:
generating a prompt requesting a user to select whether to generate the common control interface or the personalized control interface;
when detecting a selection message indicating that the user selects the common control interface, generating the control options and the status display interface based on the configuration information of the common control interface; and
when detecting a selection message indicating that the user selects the personalized control interface, generating the control options and the status display interface based on the personalized interface plug-in and the configuration information of the common control interface; and
controlling the smart device according to the control options and the status display interface.

2. The method according to claim 1, wherein the detecting of whether the smart device is set with the personalized control interface comprises:
sending an inquiring request to the smart device or a cloud server;
receiving an inquiring result returned by the smart device or the cloud server; and
determining whether the smart device is set with the personalized control interface based on the inquiring result.

3. The method according to claim 2, wherein the acquiring of the personalized interface plug-in of the smart device comprises:
sending, to the smart device or the cloud server, a request for acquiring the personalized interface plug-in; and
receiving the personalized interface plug-in returned by the smart device or the cloud server.

4. The method according to claim 1, wherein the acquiring of the personalized interface plug-in of the smart device comprises:
sending, to the smart device or a cloud server, a request for acquiring the personalized interface plug-in; and
receiving the personalized interface plug-in returned by the smart device or the cloud server.

5. The method according to claim 1, wherein the generating of the control options and the status display interface, based on at least one of the personalized interface plug-in or the configuration information of the common control interface of the smart device, comprises:
- acquiring icons and control commands corresponding to the personalized function type and a common function type in the configuration information of the common control interface, and generating the control options based on the icons and control commands; and
- acquiring display controls corresponding to the personalized status display type and a common status display type in the configuration information of the common control interface, and generating the status display interface based on the display controls.

6. The method according to claim 1, further comprising:
when detecting that the smart device is not set with the personalized control interface, generating the common control interface based on the configuration information of the common control interface.

7. A terminal, comprising:
a processor; and
a memory for storing instructions executable by the processor;
wherein the processor is configured to perform:
- when a connection is established between the terminal and a smart device, detecting whether the smart device is set with a personalized control interface;
- when detecting that the smart device is set with the personalized control interface, acquiring a personalized interface plug-in of the smart device, the personalized interface plug-in including a personalized function type and a personalized status display type;
- generating control options and a status display interface, based on at least one of the personalized interface plug-in or configuration information of a common control interface of the smart device, wherein the generating of the control options and the status display interface includes:
  - generating a prompt requesting a user to select whether to generate the common control interface or the personalized control interface;
  - when detecting a selection message indicating that the user selects the common control interface, generating the control options and the status display interface based on the configuration information of the common control interface; and
  - when detecting a selection message indicating that the user selects the personalized control interface, generating the control options and the status display interface based on the personalized interface plug-in and the configuration information of the common control interface; and
- controlling the smart device according to the control options and the status display interface.

8. The terminal according to claim 7, wherein the processor is further configured to perform:
- sending an inquiring request to the smart device or a cloud server;
- receiving an inquiring result returned by the smart device or the cloud server; and
- determining whether the smart device is set with the personalized control interface based on the inquiring result.

9. The terminal according to claim 8, wherein the processor is further configured to perform:
- sending, to the smart device or the cloud server, a request for acquiring the personalized interface plug-in; and
- receiving the personalized interface plug-in returned by the smart device or the cloud server.

10. The terminal according to claim 7, wherein the processor is further configured to perform:
- sending, to the smart device or a cloud server, a request for acquiring the personalized interface plug-in; and
- receiving the personalized interface plug-in returned by the smart device or the cloud server.

11. The terminal according to claim 7, wherein the processor is further configured to perform:
- acquiring icons and control commands corresponding to the personalized function type and a common function type in the configuration information of the common control interface, and generating the control options based on the icons and control commands; and
- acquiring display controls corresponding to the personalized status display type and a common status display type in the configuration information of the common control interface, and generating the status display interface based on the display controls.

12. The terminal according to claim 7, wherein the processor is further configured to perform:
when detecting that the smart device is not set with the personalized control interface, generating the common control interface based on the configuration information of the common control interface.

13. A non-transitory computer-readable storage medium storing instructions that, when executed by a processor in a terminal, cause the terminal to perform:
- when a connection is established between the terminal and a smart device, detecting whether the smart device is set with a personalized control interface;
- when detecting that the smart device is set with the personalized control interface, acquiring a personalized interface plug-in of the smart device, the personalized interface plug-in including a personalized function type and a personalized status display type;
- generating control options and a status display interface, based on at least one of the personalized interface plug-in or configuration information of a common control interface of the smart device, wherein the generating of the control options and the status display interface includes:
  - generating a prompt requesting a user to select whether to generate the common control interface or the personalized control interface;
  - when detecting a selection message indicating that the user selects the common control interface, generating the control options and the status display interface based on the configuration information of the common control interface; and
  - when detecting a selection message indicating that the user selects the personalized control interface, generating the control options and the status display interface based on the personalized interface plug-in and the configuration information of the common control interface; and
- controlling the smart device according to the control options and the status display interface.

14. The medium according to claim 13, wherein the detecting of whether the smart device is set with the personalized control interface comprises:
- sending an inquiring request to the smart device or a cloud server;

receiving an inquiring result returned by the smart device or the cloud server; and determining whether the smart device is set with the personalized control interface based on the inquiring result.

15. The medium according to claim 13, wherein the acquiring of the personalized interface plug-in of the smart device comprises:

sending, to the smart device or a cloud server, a request for acquiring the personalized interface plug-in; and receiving the personalized interface plug-in returned by the smart device or the cloud server.

* * * * *